United States Patent
Stenneth

(10) Patent No.: US 12,057,013 B2
(45) Date of Patent: Aug. 6, 2024

(54) METHOD, APPARATUS AND COMPUTER PROGRAM PRODUCT FOR SUPPRESSING FALSE POSITIVES OF ROAD WORK DETECTION WITHIN A ROAD NETWORK

(71) Applicant: HERE GLOBAL B.V., Eindhoven (NL)

(72) Inventor: Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 50 days.

(21) Appl. No.: 17/455,283

(22) Filed: Nov. 17, 2021

(65) Prior Publication Data
US 2023/0154319 A1    May 18, 2023

(51) Int. Cl.
G08G 1/0967     (2006.01)
G01C 21/34      (2006.01)
G05D 1/00       (2024.01)
G08G 1/01       (2006.01)

(52) U.S. Cl.
CPC ... *G08G 1/096725* (2013.01); *G01C 21/3461* (2013.01); *G05D 1/0214* (2013.01); *G08G 1/0108* (2013.01)

(58) Field of Classification Search
CPC .......... G08G 1/096725; G08G 1/0108; G01C 21/3461; G05D 1/0214; G05D 2201/0213
See application file for complete search history.

(56) References Cited

U.S. PATENT DOCUMENTS

| | | | |
|---|---|---|---|
| 9,199,641 B2 | 12/2015 | Ferguson et al. | |
| 10,829,116 B2* | 11/2020 | Iagnemma | B60W 10/20 |
| 11,458,993 B2* | 10/2022 | Brown | B60W 30/143 |
| 2014/0309833 A1 | 10/2014 | Ferguson et al. | |
| 2017/0242436 A1* | 8/2017 | Creusot | G08G 1/09626 |
| 2019/0362159 A1 | 11/2019 | Cooley | |
| 2020/0042807 A1 | 2/2020 | Schutzmeier et al. | |
| 2020/0193823 A1* | 6/2020 | Zhang | G08G 1/09623 |

FOREIGN PATENT DOCUMENTS

WO   WO 2020/205597 A1   10/2020

OTHER PUBLICATIONS

Jamshidi et al., "Fusion of Digital Map Traffic Signs and Camera-Detected Signs", 2011 5th International Conference on Signal Processing and Communication Systems (ICSPCS), (Dec. 2011), 7 pages.

* cited by examiner

*Primary Examiner* — Frederick M Brushaber
*Assistant Examiner* — Harrison Heflin
(74) *Attorney, Agent, or Firm* — Alston & Bird LLP

(57) ABSTRACT

Embodiments described herein may provide a method for using map data to alter criteria for the identification of road work in locations where false positives are more likely. Methods may include: receiving probe data from a plurality of probe apparatuses traveling within a road network; determining, from the probe data captured at a first location, an indication of road work; determining a type of map area of the first location; applying a suppression method to the probe data captured at the first location in response to the type of map area of the first location corresponding to an area having a relatively high false positive rate of indications of road work; and determining, based on the suppression method to the probe data captured at the first location, the presence or absence of road work occurring at the first location.

17 Claims, 4 Drawing Sheets

| Map Area | Road Work False Positive Effect? | Suppression Method |
|---|---|---|
| Normal | No | N/A |
| Highway Exit | Yes | Dismiss Road Work Event less than 100m long |
| School | Yes | Dismiss Road Work Object cones/temp. barricades |
| Toll Plaza | Yes | Dismiss Road Work Object cones/barricades; Increase proportion threshold to identify road work |
| Tunnel Entrance | Yes | Dismiss Road Work Event less than 100m long |
| Blacklist Zone | Yes | Dismiss Road Work Object of type found at location |

| Map Area | Road Work False Positive Effect? | Suppression Method |
|---|---|---|
| Normal | No | N/A |
| Highway Exit | Yes | Dismiss Road Work Event less than 100m long |
| School | Yes | Dismiss Road Work Object cones/temp. barricades |
| Toll Plaza | Yes | Dismiss Road Work Object cones/barricades; Increase proportion threshold to identify road work |
| Tunnel Entrance | Yes | Dismiss Road Work Event less than 100m long |
| Blacklist Zone | Yes | Dismiss Road Work Object of type found at location |

FIG. 3

ND COMPUTER
METHOD, APPARATUS AND COMPUTER PROGRAM PRODUCT FOR SUPPRESSING FALSE POSITIVES OF ROAD WORK DETECTION WITHIN A ROAD NETWORK

TECHNOLOGICAL FIELD

An example embodiment of the present invention relates generally to suppressing false positives of road work detection, and more particularly, to a method, apparatus, and computer program product for using map data to alter criteria for the identification of road work in locations where false positives are more likely.

BACKGROUND

Digital maps provide a detailed view of a road network and enable users to navigate among the road network with relative ease. Further, dynamic information such as traffic can provide additional details that help drivers navigate the road network efficiently. Beyond traffic, there are other factors that influence travel within a road network. Various hazard identification systems exist to identify potentially hazardous conditions such as road work conditions in a road network. Municipalities may publish road work events that can be used by traffic services and map data services to caution drivers of road work. These road work events generally involve little detail and often include tentative, planned schedules where the schedules may not account for various events that may impact scheduling.

Road work details within map data may not be temporally relevant, and may lag actual events due to the refresh rate of map data. Further, the dynamic nature of road work events presents challenges to map data service providers. Additionally, to further hamper automatic detection of road work events, indicators of road work are often present before or after a road work event when no road work event is ongoing, leading to false detections of the presence of road work.

BRIEF SUMMARY

A method, apparatus, and computer program product are therefore provided for suppressing false positives of road work detection, and more particularly, to a method, apparatus, and computer program product for using map data to alter criteria for the identification of road work in locations where false positives are more likely. An apparatus may be provided including at least one processor and at least one non-transitory memory including computer program code instructions, the computer program code instructions may be configured to, when executed, cause the apparatus to at least: receive probe data from a plurality of probe apparatuses traveling within a road network; determine, from the probe data captured at a first location, an indication of road work; determine a type of map area of the first location; apply a suppression method to the probe data captured at the first location in response to the type of map area of the first location corresponding to an area having a relatively high false positive rate of indications of road work; determine, based on the suppression method to the probe data captured at the first location, the presence or absence of road work occurring at the first location; and provide for at least one of route guidance or at least semi-autonomous vehicle control proximate the first location based on the determination.

According to an example embodiment, the suppression method includes at least one of: a dismissal of road work objects of a specific type at the first location, a dismissal of road work events at the first location having a length shorter than a predetermined length, or an increase in a threshold proportion of positive indications of road work at the first location to total observations from probe data captured at the first location to identify a presence of road work occurring at the first location. Road work object types include, in certain embodiments, one or more of: a static sign, a variable sign, a construction cone, a construction barrel, or a construction barricade. The type of map area of the first location includes, in some embodiments, at least one of: a highway exit map area, a school zone map area, a toll plaza map area, or a tunnel entrance map area.

According to some embodiments, the apparatus is caused to determine the presence of road work occurring at the first location based on the suppression method applied to the probe data captured at the first location, where causing the apparatus to provide for at least one of route guidance or at least semi-autonomous vehicle control proximate the first location based on the determination includes causing the apparatus to: provide an indication of the presence of road work occurring at the first location for at least semi-autonomous vehicle control. According to certain embodiments, causing the apparatus to provide the indication of the presence of road work occurring at the first location for at least semi-autonomous vehicle control includes causing the apparatus to cause an autonomous vehicle to cede control of the vehicle to a driver based on the indication of the presence of road work occurring at the first location.

The apparatus of some embodiments is further caused to: determine, from probe data captured at a second location, an indication of road work; determine a type of map area of the second location; apply a suppression method to the probe data captured at the second location in response to the type of map area of the second location corresponding to an area having a relatively high false positive rate of indications of road work; determine, based on the suppression method applied to the probe data captured at the second location, the presence or absence of road work occurring at the second location; and provide for at least one of route guidance or semi-autonomous vehicle control proximate the second location based on the determination of the presence or absence of road work occurring at the second location. The type of map area of the second location includes a different type of map area from the type of map area of the first location, and the suppression method applied to the probe data captured at the second location is different from the suppression method applied to the probe data captured at the first location.

Embodiments provided herein include a computer program product including at least one non-transitory computer-executable program code instructions stored therein, the computer-executable program code instructions including program code instructions to: receive probe data from a plurality of probe apparatuses traveling within a road network; determine, from the probe data captured at a first location, an indication of road work; determine a type of map area of the first location; apply a suppression method to the probe data captured at the first location in response to the type of map area of the first location corresponding to an area having a relatively high false positive rate of indications of road work; determine, based on the suppression method to the probe data captured at the first location, the presence or absence of road work occurring at the first location; and provide for at least one of route guidance or at least semi-autonomous vehicle control proximate the first location based on the determination.

According to an example embodiment, the suppression method includes at least one of: a dismissal of road work objects of a specific type at the first location, a dismissal of road work events at the first location having a length shorter than a predetermined length, or an increase in a threshold proportion of positive indications of road work at the first location to total observations from probe data captured at the first location to identify a presence of road work occurring at the first location. Road work object types include, in certain embodiments, one or more of: a static sign, a variable sign, a construction cone, a construction barrel, or a construction barricade. The type of map area of the first location includes, in some embodiments, at least one of: a highway exit map area, a school zone map area, a toll plaza map area, or a tunnel entrance map area.

According to some embodiments, the program code instructions determine the presence of road work occurring at the first location based on the suppression method applied to the probe data captured at the first location, where the program code instructions to provide for at least one of route guidance or at least semi-autonomous vehicle control proximate the first location based on the determination include program code instructions to: provide an indication of the presence of road work occurring at the first location for at least semi-autonomous vehicle control. According to certain embodiments, the program code instructions to provide the indication of the presence of road work occurring at the first location for at least semi-autonomous vehicle control include program code instructions to cause an autonomous vehicle to cede control of the vehicle to a driver based on the indication of the presence of road work occurring at the first location.

The computer program product of some embodiments further includes program code instructions to: determine, from probe data captured at a second location, an indication of road work; determine a type of map area of the second location; apply a suppression method to the probe data captured at the second location in response to the type of map area of the second location corresponding to an area having a relatively high false positive rate of indications of road work; determine, based on the suppression method applied to the probe data captured at the second location, the presence or absence of road work occurring at the second location; and provide for at least one of route guidance or semi-autonomous vehicle control proximate the second location based on the determination of the presence or absence of road work occurring at the second location. The type of map area of the second location includes a different type of map area from the type of map area of the first location, and the suppression method applied to the probe data captured at the second location is different from the suppression method applied to the probe data captured at the first location.

Embodiments provided herein include a method including: receiving probe data from a plurality of probe apparatuses traveling within a road network; determining, from the probe data captured at a first location, an indication of road work; determining a type of map area of the first location; applying a suppression method to the probe data captured at the first location in response to the type of map area of the first location corresponding to an area having a relatively high false positive rate of indications of road work; determining, based on the suppression method to the probe data captured at the first location, the presence or absence of road work occurring at the first location; and providing for at least one of route guidance or at least semi-autonomous vehicle control proximate the first location based on the determination.

According to an example embodiment, the suppression method includes at least one of: a dismissal of road work objects of a specific type at the first location, a dismissal of road work events at the first location having a length shorter than a predetermined length, or an increase in a threshold proportion of positive indications of road work at the first location to total observations from probe data captured at the first location to identify a presence of road work occurring at the first location. Road work object types include, in certain embodiments, one or more of: a static sign, a variable sign, a construction cone, a construction barrel, or a construction barricade. The type of map area of the first location includes, in some embodiments, at least one of: a highway exit map area, a school zone map area, a toll plaza map area, or a tunnel entrance map area.

According to some embodiments, the method includes determining the presence of road work occurring at the first location based on the suppression method applied to the probe data captured at the first location, where providing for at least one of route guidance or at least semi-autonomous vehicle control proximate the first location based on the determination includes: providing an indication of the presence of road work occurring at the first location for at least semi-autonomous vehicle control. According to certain embodiments, providing the indication of the presence of road work occurring at the first location for at least semi-autonomous vehicle control includes causing an autonomous vehicle to cede control of the vehicle to a driver based on the indication of the presence of road work occurring at the first location.

The method of some embodiments further includes: determining, from probe data captured at a second location, an indication of road work; determining a type of map area of the second location; applying a suppression method to the probe data captured at the second location in response to the type of map area of the second location corresponding to an area having a relatively high false positive rate of indications of road work; determining, based on the suppression method applied to the probe data captured at the second location, the presence or absence of road work occurring at the second location; and providing for at least one of route guidance or semi-autonomous vehicle control proximate the second location based on the determination of the presence or absence of road work occurring at the second location. The type of map area of the second location includes a different type of map area from the type of map area of the first location, and the suppression method applied to the probe data captured at the second location is different from the suppression method applied to the probe data captured at the first location.

Embodiments provided herein include an apparatus including: means for receiving probe data from a plurality of probe apparatuses traveling within a road network; means for determining, from the probe data captured at a first location, an indication of road work; means for determining a type of map area of the first location; means for applying a suppression method to the probe data captured at the first location in response to the type of map area of the first location corresponding to an area having a relatively high false positive rate of indications of road work; means for determining, based on the suppression method to the probe data captured at the first location, the presence or absence of road work occurring at the first location; and means for providing for at least one of route guidance or at least semi-autonomous vehicle control proximate the first location based on the determination.

According to an example embodiment, the suppression method includes at least one of: a dismissal of road work objects of a specific type at the first location, a dismissal of road work events at the first location having a length shorter than a predetermined length, or an increase in a threshold proportion of positive indications of road work at the first location to total observations from probe data captured at the first location to identify a presence of road work occurring at the first location. Road work object types include, in certain embodiments, one or more of: a static sign, a variable sign, a construction cone, a construction barrel, or a construction barricade. The type of map area of the first location includes, in some embodiments, at least one of: a highway exit map area, a school zone map area, a toll plaza map area, or a tunnel entrance map area.

According to some embodiments, the apparatus includes means for determining the presence of road work occurring at the first location based on the suppression method applied to the probe data captured at the first location, where the means for providing for at least one of route guidance or at least semi-autonomous vehicle control proximate the first location based on the determination includes: means for providing an indication of the presence of road work occurring at the first location for at least semi-autonomous vehicle control. According to certain embodiments, the means for providing the indication of the presence of road work occurring at the first location for at least semi-autonomous vehicle control includes means for causing an autonomous vehicle to cede control of the vehicle to a driver based on the indication of the presence of road work occurring at the first location.

The apparatus of some embodiments further includes: means for determining, from probe data captured at a second location, an indication of road work; means for determining a type of map area of the second location; means for applying a suppression method to the probe data captured at the second location in response to the type of map area of the second location corresponding to an area having a relatively high false positive rate of indications of road work; means for determining, based on the suppression method applied to the probe data captured at the second location, the presence or absence of road work occurring at the second location; and means for providing for at least one of route guidance or semi-autonomous vehicle control proximate the second location based on the determination of the presence or absence of road work occurring at the second location. The type of map area of the second location includes a different type of map area from the type of map area of the first location, and the suppression method applied to the probe data captured at the second location is different from the suppression method applied to the probe data captured at the first location.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
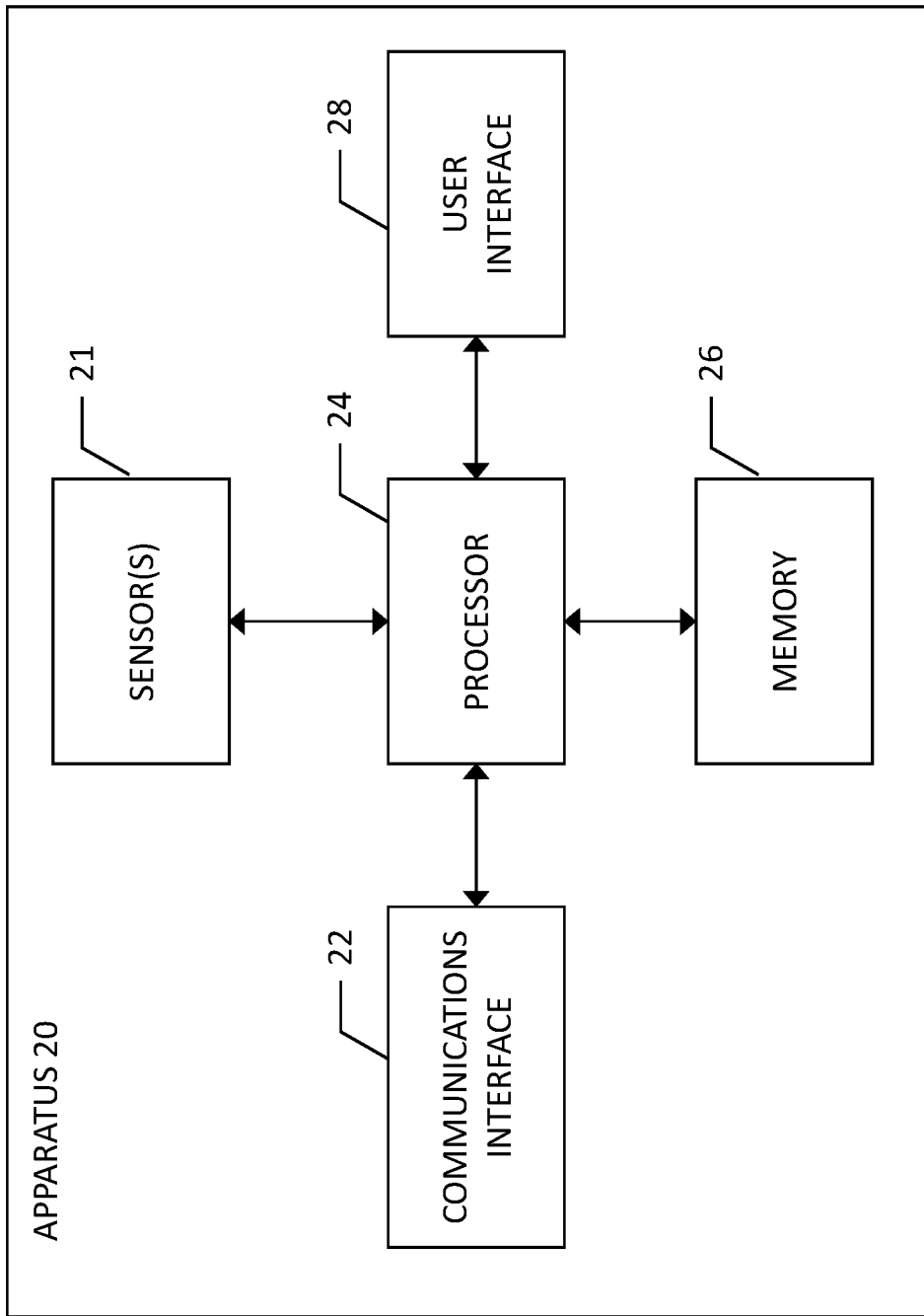
Figure 2:
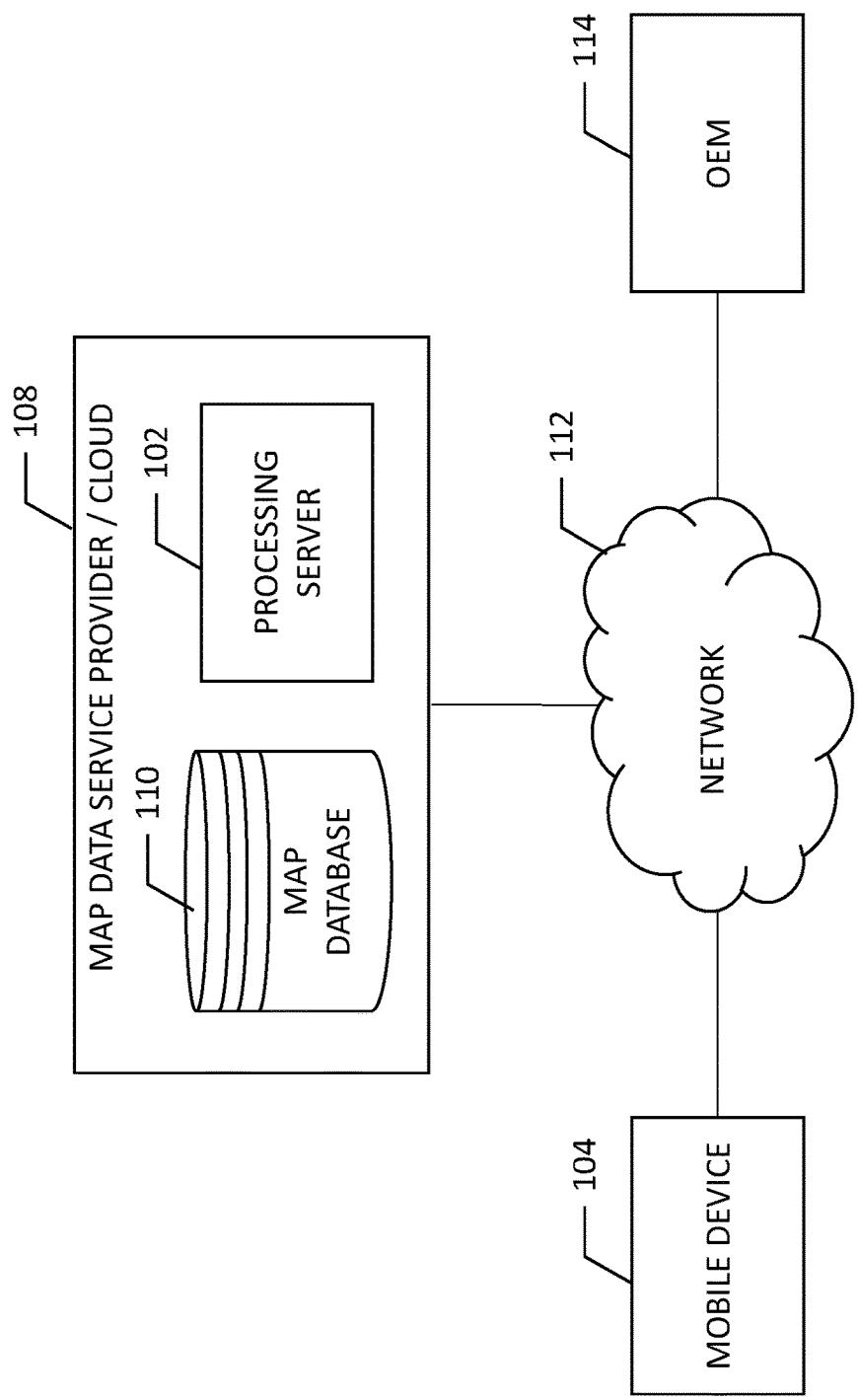
Figure 4:
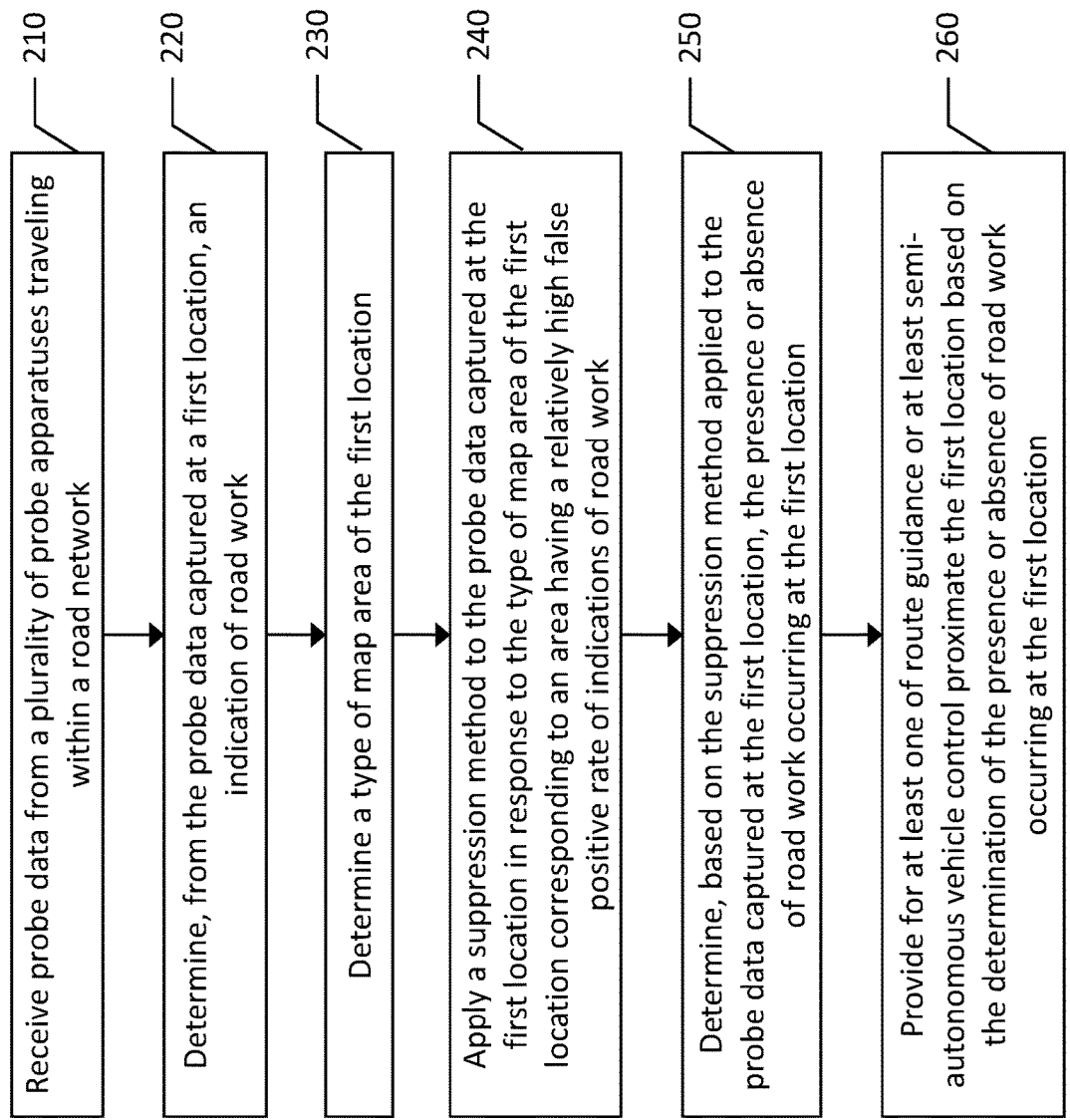

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for suppressing false positives of road work detection according to an example embodiment of the present disclosure;

FIG. 3 is a table illustrating different map area types, their effect on false positives, and any suppression method applied according to an example embodiment of the present disclosure; and FIG. 4 is a flowchart of a method for using map data to alter criteria for the identification of road work in locations where false positives are more likely according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for suppressing false positives of road work detection, and more particularly, to a method, apparatus, and computer program product for using map data to alter criteria for the identification of road work in locations where false positives are more likely. In this regard, according to certain embodiments, user interface of a device, such a mobile device or a device affixed to a vehicle, such as to a dashboard or the like, may provide work zone warnings to a user, which may aid the user in navigation or driving in an instance in which the user is traveling by vehicle. According to other embodiments described herein, road work is identified along road segments of a road network through the aggregation of sensor data from vehicles traveling along the road segments of the road network. The identification of work zones where road work events are occurring is important to establish how a vehicle should navigate an area around a work zone, and how an autonomous vehicle can function around the work zone. In some instances, autonomous vehicles may cede at least some autonomous functionality to a driver/occupant of the vehicle when approaching work zones due to the unpredictable nature of some work zones. As such, it is important to appropriately identify work zones and to suppress false positive detections of work zones and road work events.

A work zone, as described herein, includes an area within which work or construction is being performed that affects, in at least one manner, travel along a road segment. Work or construction need not be actively occurring (e.g., work crews on-site) for a work zone to be considered a work zone. Further, the work or construction that is being performed need not be on a road along which a work zone is defined, as work performed proximate a road segment may affect a road segment sufficiently for the road segment to be identified as having a work zone along the road segment. For example, while work may be performed on a shoulder of a road or even on a building or landscape adjacent to a road segment, the road segment may be impacted by the work. With workers operating adjacent to a road segment, vehicle speeds may be reduced along the road segment to safeguard the workers and increase driver awareness in the area.

Because of the dynamic nature of work zones, and road work events that involve work zones, such work zones may not be adequately represented within map data that is updated periodically. Some work zones occur only during certain times of day, while others can be persistent for months. Further, the way in which road segments are affected by work zones can change frequently. For example, in some instances, work zone speed limits may only be present during such time as workers are present. Work zones may change the number and position of open lanes along a road segment. For these reasons, conventional map data is not well equipped to handle regularly changing work zones and the details thereof that impact traffic flow, routing, and autonomous vehicle control around the area of the work zone.

Complicating the accurate detection and identification of road work events occurring along road segments are indicators of road work events being present when there is no actual road work event. Indicators such as construction cones, barrels, or barricades can appear well ahead of a road work event (e.g., stored along a roadside in anticipation of the road work) and exist well after a road work event (e.g., temporarily stored awaiting pick up or a move to a new road work site). These indicators may be used by sensors, such as those on autonomous vehicles traveling among a road network to identify work zones where road work events are occurring. Further, the identification of a work zone by sensors of a vehicle report the identification and location of a work zone to service providers such that they can alert other vehicles, navigate an area appropriately, and in the case of autonomous vehicles, take any necessary precautions in an identified work zone. A false positive identification of a work zone unnecessarily affects vehicles traveling in an area around the false positive location, and leads to lack of trust of the detection of actual road work events.

Road work indicators are also used in different circumstances, that may be falsely reported as road work events. For example, orange construction cones used to block roads in front of schools during drop off and pick up hours may be detected as indicators of the presence of road work. These cones may be staged adjacent to a road during the school day and after hours providing further potential for false positives of the presence of road work. Embodiments described herein suppress such false positive road work events to improve the accuracy with which road work is identified, and reduce the instances in which vehicles are impacted by road work events that aren't actually occurring.

Provided herein is a method, apparatus, and computer program product for using map data to alter criteria for the identification of road work in locations where false positives are more likely. The location of road work can be communicated to travelers within the road network to take necessary precautions or to avoid road work as appropriate. A driver of a vehicle using navigational assistance or an autonomous vehicle itself can determine how to proceed based on the presence of road work and a probability thereof. An autonomous vehicle, for example, may determine that manual driving is necessary such that vehicle control is handed off to a driver. Alternatively, an autonomous vehicle can determine a best path through the area in which road work is present and proceed accordingly employing any work zone specific requirements, such as lower speed limits, no passing, etc. As road work events and work zones can impact the travel of many drivers and how autonomous vehicles are controlled, it is important to ensure that road work events are not falsely identified resulting in unnecessary issues for travelers in an area.

The presence of road work and the location thereof may be provided to a user via any available device, such as a mobile phone, tablet computer, fixed computer (e.g., desktop computer), or the like. Optionally, road work information (e.g., the road work location, affected region, and changes to an affected road segment) may be provided to autonomous or semi-autonomous vehicle controls to aid the autonomous controls in providing safe travel along a road network where road work exists. One example embodiment that will be described herein includes a user device of a user traveling in a vehicle. Such a device may be a mobile personal device that a user may use within a vehicle and outside of a vehicle environment, while other devices may include a vehicle navigation system. In some embodiments, the mobile personal device may double as a vehicle navigation system.

While the term "navigation system" is used herein to describe a device used to present map data, traffic data, etc., it is to be appreciated that such a navigation system can be used via a user interface without providing route guidance information. Route guidance is provided in response to a user entering a desired destination, and where a route between the origin or current location of a user and the destination is mapped and provided to the user. A navigation system may be used in the absence of a discrete destination to provide driver assistance and information. For example, as a user travels within a road network, a driver may be made aware of an upcoming road work such that they can take any necessary precautions, or avoid the area altogether.

In example embodiments, a navigation system user interface may be provided for driver assistance for a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like.

Autonomous and semi-autonomous vehicles are classified according to the Society of Automotive Engineers (SAE) to include six distinct levels of autonomy ranging from Level 0 to Level 5. In Level 0, a vehicle may provide warnings and may momentarily intervene (e.g., anti-lock braking or stability control), but has no sustained vehicle control. Level 1 autonomy includes a "hands on" control, where the driver and the automated system share control of the vehicle. Examples include adaptive cruise control (ACC) where the driver controls steering and the automated system controls speed. The driver must be ready to retake full control at any time with Level 1 autonomy. Level 2 autonomy is "hands off" control, where the system takes full control of the vehicle including accelerating, braking, and steering. The driver must monitor the driving and be prepared to intervene at any time if the automated system fails to respond properly. A driver may be required to maintain hands on a steering wheel in this level of autonomy despite the name as the driver must be ready to intervene when appropriate.

Level 3 vehicle autonomy includes "eyes off" whereby a driver can safely turn their attention away from the driving tasks. For example, a driver of a Level 3 autonomous vehicle can watch a movie or use a mobile device. While the vehicle will handle situations that call for immediate response like emergency braking, the driver must be prepared to intervene within some limited time specified by the manufacturer when called upon to do so. Level 4 autonomous control requires no driver attention for safety and a driver can even leave a driver's seat. Self-driving is supported only in limited spatial areas that may be geofenced or under special circumstances, like traffic jams. Level 5 autonomy is "steering wheel optional" autonomy. This includes true driverless vehicles that do not require a human.

Autonomous and semi-autonomous vehicles may use HD maps and an understanding of the context (e.g., traffic, weather, road construction, etc.) to help navigate and to control a vehicle along its path. In an instance in which a vehicle is subject to complete or partial autonomous control, hazard warnings associated with a work zone defining a geographic area in which a road work is determined to exist may inform the vehicle enabling appropriate actions to be taken. Those actions may include re-routing to avoid or partially avoid the road work, or to alter the operational state of the vehicle according to the road work. Such operational state adjustments may include transitioning from autonomous control to manual control of the vehicle, increasing a sensor refresh rate in anticipation of potential rapid changes in the environment, or the like.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for aggregating sensor data to detect road work and generating, from the road work, an indication of the road work presence along one or more road segments of a road network to inform navigational systems and autonomous vehicles. For example, the computing device may be a mobile terminal, such as a personal digital assistant (PDA), mobile telephone, smart phone, personal navigation device, smart watch, tablet computer, camera, or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), Light Distancing and Ranging (LiDAR) sensor, humidity sensor, image capture sensor, precipitation sensor, accelerometer, and/or gyroscope. Any of the sensors may be used to sense information regarding the movement, positioning, or orientation of the device and for determining a weather condition at the location of the device as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 26, and/or the like).

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

According to certain embodiments, the apparatus 20 may support a mapping or navigation application so as to present maps or otherwise provide navigation or driver assistance. In order to support a mapping application, the computing device may include or otherwise be in communication with a geographic database, such as may be stored in memory device 26. For example, the geographic database includes node data records, road segment or link data records, point of interest (POI) data records, and other data records. More, fewer, or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a user device user interface and/or navigation system user interface may be provided to provide information or driver assistance to a user traveling along a network of roadways. Devices and systems may receive an indication of a current location of the user, and any location based warnings such as road work associated with the current location of the device and user. While a service provider may be specifically configured to provide location-based information to a user, such a service may be enhanced or improved through cooperation with other service providers that independently determine location based warnings and work zone areas.

According to example embodiments, map service provider database may be used to provide driver assistance via a navigation system or in conjunction with autonomous vehicle control. FIG. 2 illustrates a communication diagram of an example embodiment of a system for implementing example embodiments described herein using a navigation system and a map data service provider. The illustrated embodiment of FIG. 2 includes a mobile device 104, which may be, for example, the apparatus 20 of FIG. 1, such as a mobile phone, an in-vehicle navigation system, or the like, an original equipment manufacturer (OEM) 114, and a map data service provider or cloud service 108. Each of the mobile device 104, OEM 114, and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The OEM 114 may include a server and a database configured to receive probe data from vehicles or devices corresponding to the OEM. For example, if the OEM is a brand of automobile, each of that manufacturer's automobiles (e.g., mobile device 104) may provide probe data to the OEM 114 for processing. That probe data may be encrypted with a proprietary encryption or encryption that is unique to the OEM. The OEM may be the manufacturer or service provider for a brand of vehicle or a device. For example, a mobile device carried by a user (e.g., driver or occupant) of a vehicle may be of a particular brand or service (e.g., mobile provider), where the OEM may correspond to the particular brand or service. The OEM may optionally include a service provider to which a subscriber subscribes, where the mobile device 104 may be such a subscriber. While depicted as an OEM 114 in FIG. 2, other entities may function in the same manner described herein with respect to the OEM. As such, the OEM 114 illustrated in FIG. 2 is not limited to original equipment manufacturers, but may be any entity participating as described herein with respect to the OEMs.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data or location-based road work event data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region. These vehicles or probes may be embodied by mobile device 104 and may provide data to the map data service provider in the form of traffic speed/congestion data, weather information, location, speed, direction, etc.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

The OEM 114 may be configured to access the map database 110 via the processing server 102 through, for example, a mapping application, such that the user equipment may provide navigational assistance to a user among other services provided through access to the map data service provider 108. According to some embodiments, the map data service provider 108 may function as the OEM, such as when the map data service provider is a service provider to OEMs to provide map services to vehicles from that OEM. In such an embodiment, map data service provider 108 may or may not be the recipient of vehicle probe data from the vehicles of that manufacturer. Similarly, the map data service provider 108 may provide services to mobile devices, such as a map services provider that may be implemented on a mobile device, such as in a mapping application. According to such an embodiment, the map data service provider 108 may function as the OEM as the map developer receives the probe data from the mobile devices of users as they travel along a road network.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments. An embodiment implemented as an ADAS may at least partially control autonomous or semi-autonomous features of a vehicle with the assistance of establishing the vehicle.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Driver assistance information may be communicated to a user via a display, such as a display of user interface 28 of apparatus 20 of FIG. 1. The display may be a display of a mobile phone, or a screen of an in-vehicle navigation system, for example. In the presentation of the driver assistance information to the user it is important that the information is communicated clearly and in an easily understood manner such that a user may quickly understand the information presented. As a user of a navigation system may be driving a vehicle, it is important that the navigation information including driver assistance information is quickly and easily understood, without requiring substantial user interaction should additional information be needed by the driver.

Map information and dynamic content is provided in some embodiments by service providers, such as map data service provider 108 of FIG. 1. These services collect sensor data from connected vehicles and aggregated the collected sensor data to build high definition (HD) maps with road segment resolution down to, in some embodiments, centimeters, for an ADAs system to support autonomously controlled vehicles. The sensor data collected from vehicles traveling within the road network includes LiDAR, radar, ultrasonic sensors, cameras, geolocation, etc. Generally, ADAS dynamic content services include real time traffic, hazard warning, road signs, safety cameras, on-street parking, etc. Using backend sensor data and advanced wireless technologies (e.g., 4G and/or 5G or subsequent iterations), autonomous vehicle control can be improved through greater awareness of dynamic environmental factors.

Embodiments provided herein provide a method of using map context information to alter criteria for the identification of road work in map locations where false positives are more likely to occur. Example embodiments provided herein provide a method of using sensor data from vehicles traveling within a road network to identify where road work exists within the road network. Embodiments further determine areas of the map where false positive road work identification is more likely to occur, and to adjust criteria in those areas for what constitutes road work.

Embodiments described herein provide a method that uses sensor data to accurately identify where road work exists within a road network and adjusts criteria for establishing the presence of road work in areas where false positive reports of road work are more likely to occur. Embodiments detect road work using sensor data from vehicles traveling within a road network. Using this data, the road work location and start/end time can be determined. Using the road work location and start/end times, embodiments can identify where and when vehicular travel can be affected. Vehicles that are driven by a person can receive an indication of the road work, such as when the vehicle is approaching the road work, or the road work lies along a route that is being driven. The person driving the vehicle can take any necessary precautions, such as slowing down or avoiding the road work. Autonomous or semi-autonomous vehicles can receive an indication of the road work and take any necessary precautions automatically. For example, an autonomous vehicle may slow for road work, change lanes, or determine that autonomous control is not recommended and cede control to a driver for the duration of the road work.

Algorithms for determining where road work exists as described herein consider two primary types of data. The first type of data is a binary flag defining whether the location of a vehicle corresponds to a road work location. This binary flag is a construction yes/no flag that can be reported by sensor equipped vehicles traveling among a road network. The second type of data is a "start of construction" determination, that includes, for example posted signs, barricades, construction cones, construction barrels, or the like. Using the sensor equipped vehicle location at the time of detection of any of these objects and lateral/longitudinal offsets, accurate object locations can be identified. These objects can be used to define the start of construction or road work.

Objects that may be interpreted to indicate the start of construction include signs, where the signs may be static or variable signs. Static signs include signs such as "Work Zone" or "Lane Closed", for example. Variable signs include lighted signs, such as those presenting words, and those presenting symbols or instructions, such as a flashing arrow sign. Objects can also include barricades, cones, barrels, or the like. According to some example embodiments described herein, the detection of the beginning of a road work zone is based on a probability of a sign or object being present that signifies the "start of construction." For each segment of road within the road network, the number of positive observations are computed relative to the total number of vehicles that drove along the segment. If a threshold proportion of vehicles that drove along the segment reported positive observations of a "start of construction" object, the segment is established to include a start of a road work area.

A road segment is determined to have thereon road work if the construction zone binary flag is positive for construction work. Using the yes/no signals, for each segment, the number of positive (construction is present) observations relative to the number of total (positive (construction is present) and negative (construction is not present)) observations. If the number of positive observations relative to total observations satisfies a predetermined threshold, the road segment is established as having road work thereon. If the threshold is not satisfied, the road segment is established as not having road work thereon. According to some embodiments, there is a threshold above which a proportion of positive observations indicates road work present, and a lower threshold above which a proportion of positive observations indicates a possibility of road work. According to such embodiments, the degree of probability or the degree of confidence of the presence of road work may be conveyed to a driver/occupant of a vehicle or an autonomous vehicle, whereby action responsive to the road work and degree of probability and/or of confidence thereof can be taken.

Thresholds can be variable and can be established based on learned behavior of when thresholds correspond with ground truth observations. For example, a threshold can begin at 0.3 and can be improved with ground truth. Signals are computed only if there are at least a minimum number of vehicles having traversed a particular road segment. Weights are given to each input signal. Weights may be estimated initially and improved upon with ground truth. For example, the weight of a "start of construction" object detection may be 0.3 or 30%, while the weight of a construction zone flag (yes/no) is 0.7 or 70%. This weight can be varied based on specific location as certain countries, regions, localities may provide better signage or stronger indicators of the start of a construction zone. Ground truth observations to verify or discredit the "start of construction" data or the construction zone flag data can be used to adjust weights for different regions.

Using the "start of construction" data and the construction yes/no observations, embodiments derive the likelihood of road work being present along a road segment. For example, a relatively high proportion of "construction present" observations relative to total observations (e.g., "construction present" and "construction not present" observations) indicates that construction is present. This proportion may be predefined, such as 70%, and may be updated based on ground truth observations. Similarly, start of construction indications can be used to determine the start of a road work zone. This determination is based, in an example embodiment, on a proportion of observations confirming the start of a construction work zone.

Application of a uniform proportion of observations to determine the presence of a work zone may result in false positives in certain areas. Mapped areas exist that often include features that may be erroneously correlated with a work zone. These mapped areas include, for example, toll plazas, highway exit/entrance ramps, school zones, tunnel entrances, recently completed road work areas, etc. The identification of objects that are indicators of road work may result in some apparatuses determining that road construction is present when there is no active road work event. Embodiments described herein change the criteria for identifying road work zones for certain areas of a mapped region where road construction false-positives are more likely to exist.

Toll plazas are a type of mapped area that are likely to have objects present that are conventionally associated with road construction, resulting in a high rate of false positive reports of road construction within a toll plaza. Orange traffic cones are often used in and around toll plazas to appropriately route traffic to open and active toll lanes. Further, barricades often exist between lanes or adjacent to lanes in and around toll plazas. These objects may be incorrectly identified by a vehicle traveling through the toll plaza as indicators of road work events. To suppress false positives at toll plazas, criteria for establishing the presence of a work zone is altered. For probe data from vehicles including sensor data indicative of observations of the presence or absence of a work zone, sensor data collected within a toll plaza of a map and within a predetermined distance before and after the toll plaza (e.g., 150 meters) will be subject to a higher standard for establishing the presence of a work zone.

Sensor data collected within a toll plaza or within a predefined distance before or after a toll plaza is subject to additional processing to suppress false positive determination of the presence of a work zone. One method includes suppressing all indications of a work zone within the toll plaza area of the map. However, work zones may exist within the area of a toll plaza. Certain embodiments described herein use a higher threshold for the proportion of positive observations of road work relative to total observations. For example, if a typical threshold is a proportion of 70% of observations need to be positive to identify a road work event, within a toll plaza area, that proportion may be increased to 90% given the increased likelihood of false positives. Optionally, sensor data collected within a toll plaza area is processed differently in determining the presence of road work. For example, objects that are conventionally associated with road work, such as concrete barriers and orange construction cones, may not be deemed indicative of road work when found in sensor data from within the toll plaza area. Road work indicators may be limited to objects not conventionally found in a toll plaza area, such as construction signage, construction equipment, etc. In this manner, sensor data is processed differently within a toll plaza area in determining the presence of a work zone.

Another example embodiment of a map area that may present an increased likelihood of false positive determinations of road work includes highway ramp exits. Vehicle sensor data can generate false positive indications of the presence of road work at highway exit ramps due to the presence of black/yellow crash cushions/barrels that are often found at exit ramps. Further, road markings and the start of a guard rail divider at the exit ramp separation can produce false indications of the presence of road work. To mitigate and suppress false positive indications of the presence of road work at highway exit ramps, sensor data including indications of road work may be processed differently than elsewhere along the road network. For example, indications of road work from sensor data that indicates a road work zone that is less than 100 meters long may be discarded as unlikely to be actual road work. Since the objects likely to result in a false positive for the presence of road work are relatively short in length (e.g., impact absorbing cushions) at less than 20 meters, and factoring in granularity of around 50 meter spatial granularity and GPS inaccuracies, a false positive threshold of around 100 meters would mitigate most such false positive indications. Tunnel entrances include features similar to highway exit ramps and may be treated as such by example embodiments described herein, where road work at least partially within 100 meters of a tunnel entrance that is less than 100 meters long may be discarded as a likely indication of a false positive indication of road work.

School zones provide another area of a map where false positives identifying road work may be found. For roads that are directly in front of school entrances, school crossing guards may place cones or barricades to prevent or guide motorized transportation in the vicinity of children that are going to school or coming from school. Based on map data indicating a school (e.g., as a category of point-of-interest), false positive indications of road work can be suppressed. False positives can be suppressed such as by a length of the identified road work (e.g., less than 50 meters may be discarded as a false positive) or by a type of object found (e.g., orange cones). Certain indications of road work may continue to be used as a positive observation of road work, such as non-mobile barriers (e.g., concrete or large plastic barriers), road work signs, or the like.

Construction-like objects are found in various locations throughout a road network and may result in false positive indications of road work. Construction-like objects such as yellow bollards found, for example, in parking lots, parking garages, protecting sensitive equipment (e.g., electrical transformers or gas meters) can be erroneously identified as indicators of road work. Further, high-visibility barriers that may be present around certain buildings (e.g., shopping centers, government installations, etc.) may be falsely identified as indicative of road work. When these objects are encountered with sensor equipped vehicles and later identified (e.g., through manual identification, artificial intelligence, image recognition, etc.) as not being related to road work, the areas around these objects may be blacklisted or flagged as being unrelated to road work. In doing so, later detection of these objects by a sensor-equipped vehicle may recognize the area from which the indication of road work was captured and discard the indication as a false positive based on the learned experience.

As described above, a map, such as HD map of map database 110 includes certain areas within the mapped road network where sensor data indicative of road work is handled differently than typical within the road network. In an example embodiment, road work indicators received from a vehicle, in the form of "construction—yes" or "start of construction" are received with an indication of location and time associated with the indicator. The location is map-matched to a road segment, and embodiments can establish whether the location is susceptible to false positive indications of road work. If the location is susceptible to false positive indications of road work, the sensor data from that area can be processed based on the type of area to mitigate false positive indicators of road work.

FIG. 3 illustrates an example embodiment of a table defining areas of a map that may have an effect. The list in FIG. 3 is not exhaustive, but merely illustrative of how different areas of a mapped region are configured to process indicators of road work objects and road work events differently. As illustrated, in the case of a "normal" map area, no suppression method may be employed to mitigate false positive indications of road work events as it is generally not a concern in "normal" map areas that do not have objects and environments that resemble road work. In a map area identified as a highway exit, which includes a point at which an exit ramp departs from a highway and a predetermined distance before and after such a point, there exists a road work false positive effect. That effect is, for example, an increase in objects identified as road work object indicators, such as construction cones. The suppression method employed in such an embodiment is to dismiss road work events that are identified as being less than 100 meters long. This ensures crash absorbing barriers are not improperly identified as road work events or objects.

A school map area is illustrated in FIG. 3 to have a false positive effect for road work. The suppression method for a school map area includes to dismiss road work objects that are identified as cones and temporary barricades. Other objects, such as road work signs or semi-permanent barricades (e.g., those that aren't moved daily for drop-off/pick-up times) are dismissed within the school map area as they are often false positive indicators of road work in that particular area. The toll plaza map area, which can include border crossings (immigration and customs), park entrances, etc., is identified as an area that has a road work false positive effect. In such an area, cones and barricades are often present, such that these objects are dismissed from sensor data indicating that such objects are detected as road work objects. Further, embodiments may increase a proportion of positive indicators of road work that are required to establish a road work event and a work zone. While a normal map area may only require a first threshold proportion of positive indicators of road work (e.g., 75%), a toll plaza area may have a second threshold proportion of positive indicators of road work (e.g., 90%) before a road work event is established as present. This increase in the threshold provides further suppression of false positive indications of a road work event and minimizes disruption to travelers.

A map area identified as a tunnel entrance is identified as a having a road work false positive effect and includes a suppression method similar to that of a highway exit. FIG. 3 further illustrates a "blacklist zone". This can be any type of area of a map, including parking lots and structures, government buildings, retail store areas, etc. The suppression method may be specific to a given area as each such area may be unique. However, the suppression method of an example embodiment includes dismissal of road work objects found of a specific type identified to be present at the location in the absence of road work. This can prevent certain locations from regularly registering false positives of road work based on features found at the locations.

Using the suppression methods described herein to reduce false positive indications of road work, the system of example embodiments can more accurately and repeatably identify road work events and work zones that can be relied upon more heavily in practice. With more accurate identification of road work events and work zones, vehicles and drivers are less likely to dismiss a work zone as erroneous. Thus, it is important to reduce false positive reports of the presence of road work.

FIG. 4 is a flowcharts illustrative of methods according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 4 illustrates a method for using map data to alter criteria for the identification of road work in locations where false positives are more likely. Probe data is received at 210 from a plurality of probe apparatuses traveling within a road network. The probe apparatuses may include, for example, mobile device 104 of FIG. 2, with probe data received by the map data service provider 108 via the network 112. A determination is made from the probe data captured at the first location of an indication of road work at 220. A type of map area of the first location is identified at 230. This may be performed, for example, using map database 110. A suppression method is applied to the probe data captured at the first location in response to the type of map area of the first location corresponding to an area having a relatively high false positive rate of indications of road work at 240. Based on the suppression method applied to the probe data, the presence or absence of road work is determined at 250. Embodiments provide at 260 for at least one of route guidance or semi-autonomous vehicle control proximate the first location based on the determination of the presence or absence of road work occurring at the first location.

In an example embodiment, an apparatus for performing the methods of FIGS. 3 and/or 4 above may comprise a processor (e.g., the processor 24) configured to perform some or each of the operations (210-260) described above. The processor may, for example, be configured to perform the operations (210-260) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 210-260 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive probe data from a plurality of probe apparatuses traveling within a road network;
   determine, from probe data captured at a first location, an indication of road work;
   determine a type of map area of the first location;
   apply a suppression method to the probe data captured at the first location in response to the type of map area of the first location corresponding to an area having a relatively high false positive rate of indications of road work;
   determine, based on the suppression method applied to the probe data captured at the first location, the presence or absence of road work occurring at the first location; and
   provide for at least one of route guidance or at least semi-autonomous vehicle control proximate the first location based on the determination of the presence or absence of road work occurring at the first location,
   wherein the suppression method comprises at least one of:
   a dismissal of road work objects of a specific type at the first location,
   a dismissal of road work events at the first location having a length shorter than a predetermined length, or
   an increase in a threshold proportion of positive indications of road work at the first location to total observations from probe data captured at the first location to identify a presence of road work occurring at the first location.

2. The apparatus of claim 1, wherein road work object types comprise one or more of: a static sign, a variable sign, a construction cone, a construction barrel, or a construction barricade.

3. The apparatus of claim 1, wherein a type of map area of the first location includes at least one of:
   a highway exit map area,
   a school zone map area,
   a toll plaza map area, or
   a tunnel entrance map area.

4. The apparatus of claim 1, wherein the apparatus is caused to determine the presence of road work occurring at the first location based on the suppression method applied to the probe data captured at the first location,
   wherein causing the apparatus to provide for at least one of route guidance or at least semi-autonomous vehicle control proximate the first location based on the determination comprises causing the apparatus to:
   provide an indication of the presence of road work occurring at the first location for at least semi-autonomous vehicle control.

5. The apparatus of claim 4, wherein causing the apparatus to provide the indication of the presence of road work occurring at the first location for at least semi-autonomous vehicle control comprises causing the apparatus to:
   cause an autonomous vehicle to cede control of the vehicle to a driver based on the indication of the presence of road work occurring at the first location.

6. The apparatus of claim 1, wherein the apparatus is further caused to:
   determine, from probe data captured at a second location, an indication of road work;
   determine a type of map area of the second location;
   apply a suppression method to the probe data captured at the second location in response to the type of map area of the second location corresponding to an area having a relatively high false positive rate of indications of road work;
   determine, based on the suppression method applied to the probe data captured at the second location, the presence or absence of road work occurring at the second location; and
   provide for at least one of route guidance or at least semi-autonomous vehicle control proximate the second location based on the determination of the presence or absence of road work occurring at the second location.

7. The apparatus of claim 6, wherein the type of map area of the second location comprises a different type of map area from the type of map area of the first location, and wherein the suppression method applied to the probe data captured at the second location is different from the suppression method applied to the probe data captured at the first location.

8. A computer program product comprising at least one non-transitory computer-readable storage medium having computer-executable program code instructions stored therein, the computer-executable program code instructions comprising program code instructions to:

receive probe data from a plurality of probe apparatuses traveling within a road network;

determine, from probe data captured at a first location, an indication of road work; determine a type of map area of the first location, wherein a type of map area of the first location includes at least one of:
- a highway exit map area,
- a school zone map area,
- a toll plaza map area, or
- a tunnel entrance map area;

apply a suppression method to the probe data captured at the first location in response to the type of map area of the first location corresponding to an area having a relatively high false positive rate of indications of road work;

determine, based on the suppression method applied to the probe data captured at the first location, the presence or absence of road work occurring at the first location; and provide for at least one of route guidance or at least semi-autonomous vehicle control proximate the first location based on the determination of the presence or absence of road work occurring at the first location.

9. The computer program product of claim 8, wherein the suppression method comprises at least one of:
- a dismissal of road work objects of a specific type at the first location,
- a dismissal of road work events at the first location having a length shorter than a predetermined length, or
- an increase in a threshold proportion of positive indications of road work at the first location to total observations from probe data captured at the first location to identify a presence of road work occurring at the first location.

10. The computer program product of claim 9, wherein road work object types comprise one or more of: a static sign, a variable sign, a construction cone, a construction barrel, or a construction barricade.

11. The computer program product of claim 8, wherein the program code instructions determine the presence of road work occurring at the first location based on the suppression method applied to the probe data captured at the first location,
wherein the program code instructions to provide for at least one of route guidance or at least semi-autonomous vehicle control proximate the first location based on the determination comprise program code instructions to:
provide an indication of the presence of road work occurring at the first location for at least semi-autonomous vehicle control.

12. The computer program product of claim 11, wherein the program code instructions to provide the indication of the presence of road work occurring at the first location for at least semi-autonomous vehicle control comprise program code instructions to:
cause an autonomous vehicle to cede control of the vehicle to a driver based on the indication of the presence of road work occurring at the first location.

13. The computer program product of claim 8, further comprising program code instructions to:

determine, from probe data captured at a second location, an indication of road work;
determine a type of map area of the second location;
apply a suppression method to the probe data captured at the second location in response to the type of map area of the second location corresponding to an area having a relatively high false positive rate of indications of road work;
determine, based on the suppression method applied to the probe data captured at the second location, the presence or absence of road work occurring at the second location; and
provide for at least one of route guidance or at least semi-autonomous vehicle control proximate the second location based on the determination of the presence or absence of road work occurring at the second location.

14. The computer program product of claim 13, wherein the type of map area of the second location comprises a different type of map area from the type of map area of the first location, and wherein the suppression method applied to the probe data captured at the second location is different from the suppression method applied to the probe data captured at the first location.

15. A method comprising:
receiving probe data from a plurality of probe apparatuses traveling within a road network;
determining, from probe data captured at a first location, an indication of road work;
determining a type of map area of the first location;
applying a suppression method to the probe data captured at the first location in response to the type of map area of the first location corresponding to an area having a relatively high false positive rate of indications of road work;
determining, based on the suppression method applied to the probe data captured at the first location, the presence or absence of road work occurring at the first location; and
providing for at least one of route guidance or at least semi-autonomous vehicle control proximate the first location based on the determination of the presence or absence of road work occurring at the first location,
wherein the suppression method comprises at least one of:
- a dismissal of road work objects of a specific type at the first location,
- a dismissal of road work events at the first location having a length shorter than a predetermined length, or
- an increase in a threshold proportion of positive indications of road work at the first location to total observations from probe data captured at the first location to identify a presence of road work occurring at the first location.

16. The method of claim 15, wherein road work object types comprise one or more of: a static sign, a variable sign, a construction cone, a construction barrel, or a construction barricade.

17. The method of claim 15, wherein a type of map area of the first location includes at least one of:
- a highway exit map area,
- a school zone map area,
- a toll plaza map area, or
- a tunnel entrance map area.

* * * * *